W. S. ELLIOTT.
OIL PURIFIER.
APPLICATION FILED DEC. 20, 1907.

926,179.

Patented June 29, 1909.
2 SHEETS—SHEET 1.

WITNESSES

INVENTOR

Wm S. Elliott,

W. S. ELLIOTT.
OIL PURIFIER.
APPLICATION FILED DEC. 20, 1907.

926,179.

Patented June 29, 1909.
2 SHEETS—SHEET 2.

WITNESSES

INVENTOR

UNITED STATES PATENT OFFICE.

WILLIAM S. ELLIOTT, OF PITTSBURG, PENNSYLVANIA.

OIL-PURIFIER.

No. 926,179.

Specification of Letters Patent.

Patented June 29, 1909.

Application filed December 20, 1907. Serial No. 407,401.

*To all whom it may concern:*

Be it known that I, WILLIAM S. ELLIOTT, of Pittsburg, Allegheny county, Pennsylvania, have invented a new and useful Oil-Purifier, of which the following is a full, clear, and exact description, reference being had to the accompanying drawings, forming part of this specification.

My invention has relation to the means for straining, treating for purification, and filtering oil, and is designed to provide a simple and compact form of apparatus by means of which these several operations may be conveniently and effectively performed.

The precise nature of my invention will be best understood by reference to the accompanying drawings, in which I have shown two different embodiments thereof, it being premised, however, that various changes may be made therein by those skilled in the art without departing from the spirit and scope of my invention.

Figure 1:
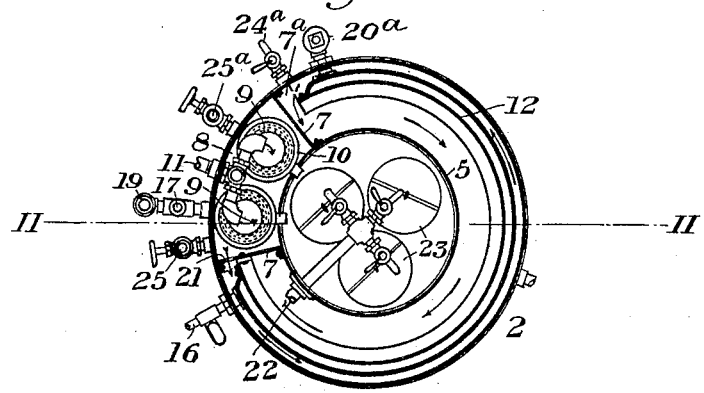
Figure 2:
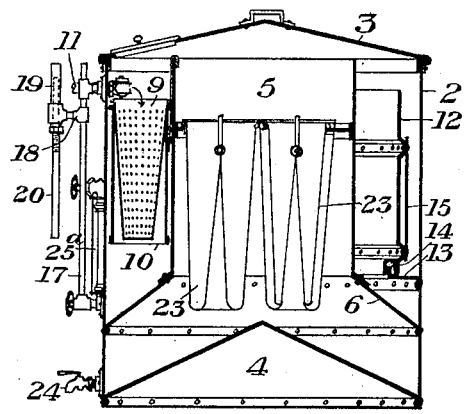
Figure 3:
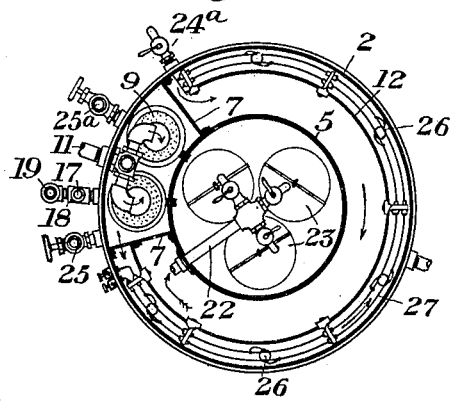
Figure 4:
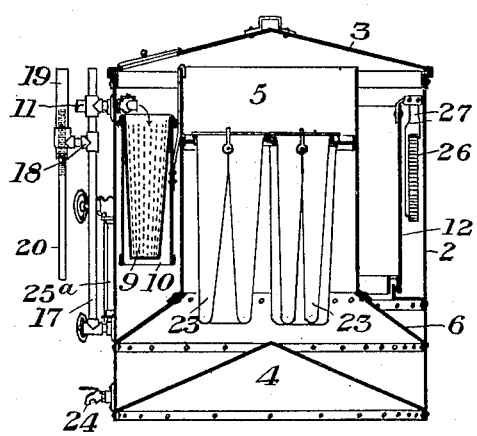

Figure 1 is a plan view, with the cover or top removed, of one form of apparatus embodying my invention; Fig. 2 is a section on the line II—II of Fig. 1; and Figs. 3 and 4 are views which are respectively similar to Figs. 1 and 2, but showing a modified form of the apparatus.

In these drawings, the numeral 2 designates an outer cylindrical vessel, preferably of sheet metal having a closed top portion 3 and a bottom portion 4. Placed concentrically within the outer vessel 2 is an inner vessel 5 of considerably smaller diameter, forming a space between the inner and outer vessels. Placed in this space are the two radial partition walls 7, which inclose between them a strainer chamber 8, in which are placed a number of strainer vessels, two of these vessels being shown in the present instance. Each of these is shown as consisting of a frusto-conical strainer proper 9 open at its upper end and set within a surrounding open-ended vertically placed cylinder 10.

11 designates an oil supply pipe, one branch of which is arranged to discharge into the upper end of each of the strainers 9.

Placed in the space between the inner and outer vessels between the two partition walls in the space outside of the strainer chamber, is a third vessel 12, and which is removably supported upon a lip or flange 13 secured to the wall of the outer vessel 2 with an interposed packing 14. Surrounding the lower portion of this intermediate vessel 12 is a heating jacket 15, which is supplied with steam by means of the circulating pipe 16.

17 is a water outlet pipe, which communicates at its lower end with the lower portion of the strainer chamber. This pipe is placed exteriorly of the vessel, and rises to a point near the upper end thereof where it is connected by a tee 18 with a discharge pipe. This discharge pipe consists of an upper member 19, in the lower end of which is adjustably secured a pipe member 20 of smaller diameter, which is so arranged within the pipe 19 that the water which enters the pipe 19 from the pipe 17 is compelled to rise therein to the upper end of the pipe 20 before it can enter said pipe and escape.

The operation is as follows:—The oil to be purified enters the apparatus through the oil supply pipe, and after passing through the suspended strainers, it is discharged into the water-separating chamber below the strainers, the oil rising to the top, and the water settling to the bottom where it is automatically discharged by means of the trap described. This automatic discharge trap permits only a few inches of water to remain in the bottom of the separating chamber, so that the flooding of the apparatus with water is impossible. After the oil has been separated from the water, it passes into the heating chamber or passageway through the opening 21 in one of the partition walls 7, and passes slowly around this chamber or passage until it reaches the entrance 7$^a$ to the treating or purifying chamber. It then enters this last-named chamber in which it passes around again, but in the opposite direction, until it reaches the discharge pipe or passage 22 through which it flows into the filter bags 23 suspended within the filtering chamber, and is filtered and discharged into the clean oil chamber in the lower portion of the apparatus, and from which it may be drawn off at the draw-off cock or faucet 24.

The heating is accomplished by the use of the steam jacket, which may be supplied with exhaust steam, or steam at atmospheric pressure.

20$^a$ is a relief valve, which is opened by hand when the steam is first turned into the purifier so as to release the air from the jacket.

25 is a gage which shows the height of the oil in the clean oil chamber.

25ª is a gage which is connected to the water separating chamber, and which shows the height of water in that chamber, so that the operator may properly adjust the automatic discharge pipe to maintain the proper water level in the water-separating chamber. If the same kind of oil is being filtered all the time, this automatic discharge trap, after being once adjusted, requires no further attention.

From the foregoing it will be observed that the oil is first strained,—second, separated from the entrained water,—third, heated to a high temperature, and fourth, treated in the treating chamber at this temperature, thereby releasing the heavy impurities and allowing them to settle at the bottom of the chamber, which prevents their passing through the filter bags and clogging them up; fifth, then filtered through the filter bags, and delivered into the clean oil chamber in a pure condition ready for use.

The form of the apparatus shown in Figs. 3 and 4 is the same as that shown in Figs. 1 and 2, with the exception that instead of the heating jacket 15 electric heating coils 26 are suspended within the space between the intermediate vessel 12 and the outer vessel 2. These coils are supplied with current by means of the conductors 27.

The apparatus described forms a very compact and convenient means by which the several operations of straining, purifying, and filtering the oil, may be carried out in a single apparatus.

The apparatus can be cheaply constructed, as it can be composed largely of sheet metal. The parts can be readily assembled, and also conveniently removed for cleaning, etc. Waste oil which has been used for lubricating bearings invariably contains more or less water, minute metallic particles, carbon, dust, and other foreign matter. By means of the apparatus described this oil may be restored to its original purity and value. As a large percentage of the work of removing the impurities is done in the purifying or treating chamber, the filter bags have only a small percentage of the dirt to remove; consequently, they do not need to be renewed as frequently as is the case with the ordinary filters where these bags and their contained filtering material are compelled to remove the heavy as well as the light impurities. The value of this mode of treating the oil over the ordinary methods of oil washing and cleaning, will be appreciated by those familiar with this art. No hot water, bone dust, charcoal, or other injurious foreign substance, comes in contact with the oil to contaminate it, and the oil is delivered in a pure unadulterated condition, freed from all impurities, and with its lubricating qualities unimpaired.

It will be obvious that various changes may be made in the details of the construction and arrangement of the several parts, without departing from the spirit and scope of my invention as defined in the appended claims.

I claim:—

1. In apparatus for treating oil, a vessel having therein a straining chamber, a heating chamber connected with the straining chamber, a separate treating chamber connected with the heating chamber at the opposite end portion from its connection with the straining chamber, said heating and treating chambers being closed to each other at the bottom and a filter chamber having a connection with the treating chamber, substantially as described.

2. In apparatus for treating oil, a vessel having a straining chamber therein, a heating chamber, a treating chamber, and a filter chamber, the heating, treating, and filter chambers being concentrically arranged, there being an oil passage from the straining chamber into one end portion of the heating chamber, a second oil passage connecting the opposite end portion of the heating chamber with the treating chamber and a third oil passage from the treating chamber into the filter chamber, said passages being so arranged that the oil is caused to circulate in opposite directions around the heating and treating chambers, said heating and treating chambers being closed to each other at the bottom, substantially as described.

3. In apparatus for treating oil, a vessel having therein concentrically arranged heating and purifying chambers, said chambers being closed to each other at the bottom and means for causing the oil to circulate in one direction around the heating chamber, thence into the purifying chamber, and thence through the purifying chamber, substantially as described.

4. In apparatus for treating oil, an outer containing vessel divided into upper and lower compartments, an inner wall or vessel containing filtering means, a purifying chamber surrounding the filtering chamber, a heating chamber surrounding the purifying chamber and connected therewith at one end portion only the heating and purifying chambers being closed to each other at their bottoms, and straining means for straining the oil delivered to the heating chamber; substantially as described.

5. In an apparatus for treating oil, an outer containing chamber divided into upper and lower compartments, an inner filtering chamber opening at its bottom into the lower compartment of the outer vessel, a purifying chamber surrounding the filtering chamber, a heating chamber surrounding the purifying chamber, and connected therewith at one end portion only, said purifying and heating chambers being closed to each other at their bottoms a straining chamber having strainers therein, and means for separating the oil and water in the straining chamber and discharging the water therefrom; substantially as described.

6. In apparatus for treating oil, a vessel having therein a straining chamber, a heating chamber connected with the straining chamber, a separate treating chamber connected with the heating chamber at the opposite end portion from its connection with the straining chamber, said heating and treating chambers being closed to each other at the bottom, and the straining chamber having a perforated strainer therein, a laterally closed vessel surrounding said strainer receptacle and open at its lower end, and a water outlet communicating with the space below the strainer receptacle and having means for regulating the discharge of water from the bottom of the straining chamber; substantially as described.

7. In apparatus for treating oil, an outer containing vessel having upper and lower compartments, an inner concentrically arranged filtering chamber having filtering means therein, and opening at its lower end into the lower compartment of the outer vessel, radial partitions in the space between the inner and outer vessels forming a segmental straining chamber, straining and water-separating means in said segmental chamber, a purifying chamber partially surrounding the filtering chamber, and a heating chamber surrounding the purifying chamber and connected with the same at one end only, the heating and purifying chambers being closed to each other at the bottom said chambers having passages whereby the oil flows from the straining chamber into the heating chamber, and thence into and through the purifying chamber into the filtering chamber; substantially as described.

8. In apparatus for treating oil, a containing vessel having separating means therein with means for discharging the separated water, a heating chamber into which the oil enters from the separator, a treating chamber closed at its bottom from the heating chamber, and a filter chamber, said chambers being concentrically arranged, and having connecting passages, whereby the oil first flows from the separator into and through the heating chamber, thence into and through the treating chamber, thence into and through the filter, substantially as described.

In testimony whereof, I have hereunto set my hand.

WILLIAM S. ELLIOTT.

Witnesses:
 JOHN MILLER,
 H. M. CORWIN.